June 4, 1929.  F. THARALDSEN  1,715,960
CONDENSER FOR ZINC VAPORS FROM ELECTRIC FURNACES
Filed June 26, 1923
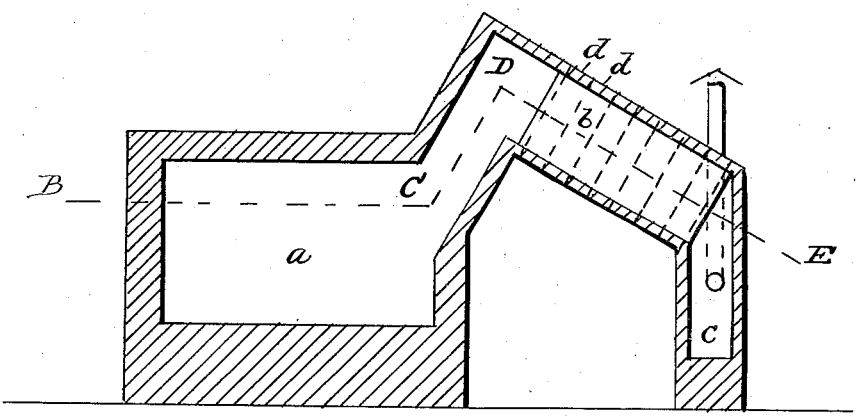
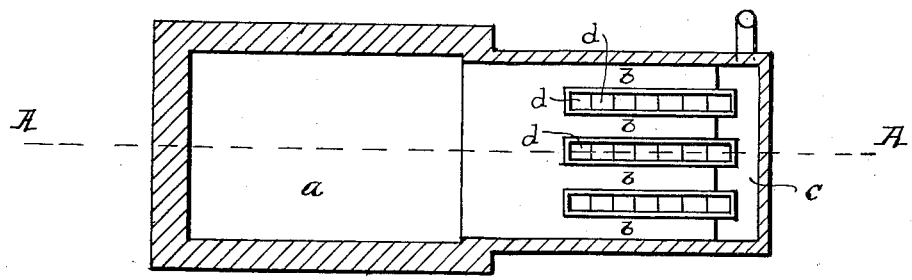
Inventor
Filip Tharaldsen.
by Henry Orth Jr
Atty Patented June 4, 1929.

1,715,960

UNITED STATES PATENT OFFICE.

FILIP THARALDSEN, OF CHRISTIANIA, NORWAY.

CONDENSER FOR ZINC VAPORS FROM ELECTRIC FURNACES.

Application filed June 26, 1923, Serial No. 647,948, and in Norway November 3, 1921.

In the U. S. Patent No. 1,417,953, a process for condensing zinc vapors is disclosed, according to which the metal vapors together with the noncondensable gases are passed through inclined condenser tubes or channels arranged one after another, so that a continuous condenser channel is formed. In practice this condenser will bring about certain inconveniences, especially because the condenser must have a disproportionately great length in order to afford a sufficient cooling surface.

In the condenser that is the object of my present invention the said disadvantage is obviated by using several parallel condenser tubes or channels instead of one continuous channel. In order to profit as much as possible from the tendency of the zinc vapors to segregate along the bottom of the tubes while the noncondensable gases gather in the upper part, the tubes or channels are given a great height. At the same time the individual channels are made relatively narrow and are separated by a space through which a refrigerating medium, such as for instance, air, may pass in order to obtain a large effective cooling surface. The compact construction of the condenser according to the present invention makes it also possible to utilize the heat absorbed by the cooling medium. In the space between the individual condenser tubes or channels may for instance be installed circulation-elements for a boiler. The heat from the condenser channels will then be absorbed by these water-containing elements and be utilized for the production of steam in the boiler.

The invention is illustrated in the annexed drawing in which: Fig. 1 is a longitudinal section on the line A—A of Fig. 2 and Fig. 2 is a transverse section on the line B—C—D—E of Fig. 1.

From the furnace chamber —a— zinc vapors and carbon monoxide are conducted through the parallel inclined condenser channels —b—, where the zinc vapor condenses and the products of condensation fall down into a common container —c—. In the spaces between the individual condenser channels water containing elements —d, d— may be installed communicating with a boiler (not shown in the drawing).

From the construction illustrated and described it will be noted that the condensing tubes or channels are narrow and deep and decidedly inclined, to obtain a maximum efficiency for condensers for electric zinc distilling furnaces. The combination of great depth and inclination, preferably associated with small width, gives a maximum of efficiency, and has reduced the formation of blue powder by these electric furnaces.

While the ordinary muffle furnace of good construction will give only about 10% of powder and 90% spelter, the electric furnaces have heretofore not been so efficient, and by my invention I have succeeded in producing spelter well within the muffle range. This I attribute to the deep channels and their inclination. If the channels are not deep there is not sufficient depth to allow the gases to separate into two moving layers through the channels, the upper layer of non-condensible gases poor in zinc, and the lower layer mainly of globules of condensed zinc.

Further, it is essential to the effect of the condenser that its channels have a certain inclination. Only in passing such sloping channels the gaseous products of the furnace will by and by segregate into a lower layer of condensing zinc globules and an upper layer of mainly non-condensible gases. This segregation, which essentially diminishes the oxidation of the condensing zinc globules by the action of the non-condensible gases, particularly of the $CO_2$ contained therein, will not take place if the inclination of the channels exceeds a certain amount. In such case the segregation will be impeded, because of the constituents of the presumed two layers will be mixed during the downward movement of the products in the channels. Moreover, such segregation cannot at all be realized, if the condenser channels are vertical.

It is easily understood that in order to obtain the said segregation, the gravitation which causes the sinking of the globules of condensing zinc in the channels, must necessarily act at an angle to the movement of the gases and vapors through the condenser channels. If this angle is zero, or even rather small, the segregation is rendered impossible.

The zinc globules are forced downwardly under the influence of gravity and collect on the inclined surfaces where they coalesce and eventually run down to the bottom.

I claim:

A condenser for zinc vapors from electric furnaces comprising a block of deep, relatively narrow separate parallel channels spaced apart and inclined downwardly from the furnace chamber to a common container for collecting the products of condensation.

In witness whereof I affix my signature.

FILIP THARALDSEN.